United States Patent
Shaubi et al.

(10) Patent No.: US 11,568,531 B2
(45) Date of Patent: Jan. 31, 2023

(54) METHOD OF DEEP LEARNING-BASED EXAMINATION OF A SEMICONDUCTOR SPECIMEN AND SYSTEM THEREOF

(71) Applicant: APPLIED MATERIALS ISRAEL LTD., Rehovot (IL)

(72) Inventors: Ohad Shaubi, Yavne (IL); Denis Suhanov, Ashdod (IL); Assaf Asbag, Alfei Menashe (IL); Boaz Cohen, Lehavim (IL)

(73) Assignee: Applied Materials Israel Ltd., Rehovot (IL)

( * ) Notice: Subject to any disclaimer, the term of this patent is extended or adjusted under 35 U.S.C. 154(b) by 303 days.

(21) Appl. No.: 16/892,123

(22) Filed: Jun. 3, 2020

(65) Prior Publication Data
US 2020/0294224 A1  Sep. 17, 2020

(51) Int. Cl.
*G06K 9/00* (2022.01)
*G06T 7/00* (2017.01)
(Continued)

(52) U.S. Cl.
CPC .......... *G06T 7/0004* (2013.01); *G06K 9/6267* (2013.01); *G06T 7/00* (2013.01);
(Continued)

(58) Field of Classification Search
CPC ....... G06T 7/0004; G06T 7/00; G06T 7/0002; G06T 2207/20081; G06T 2207/20084;
(Continued)

(56) References Cited

U.S. PATENT DOCUMENTS

2014/0072204 A1  3/2014  Minekawa et al.
2016/0163035 A1  6/2016  Chang et al.
(Continued)

OTHER PUBLICATIONS

Su, Hang, et al. "Multi-view convolutional neural networks for 3d shape recognition " Proceedings of the IEEE international conference on computer vision. 2015, 9 pgs.
(Continued)

*Primary Examiner* — Samir A Ahmed
(74) *Attorney, Agent, or Firm* — Lowenstein Sandler LLP

(57) ABSTRACT

There is provided a method of examination of a semiconductor specimen and a system thereof. The method comprises: using a trained Deep Neural Network (DNN) to process a fabrication process (FP) sample, wherein the FP sample comprises first FP image(s) received from first examination modality(s) and second FP image(s) received from second examination modality(s) which differs from the first examination modality(s), and wherein the trained DNN processes the first FP image(s) separately from the second FP image(s); and further processing by the trained DNN the results of such separate processing to obtain examination-related data specific for the given application and characterizing at least one of the processed FP images. When the FP sample further comprises numeric data associated with the FP image(s), the method further comprises processing by the trained DNN at least part of the numeric data separately from processing the first and the second FP images.

20 Claims, 8 Drawing Sheets

(51) Int. Cl.
G06K 9/62 (2022.01)
G06V 10/40 (2022.01)
G06V 10/98 (2022.01)

(52) U.S. Cl.
CPC ............ *G06T 7/0002* (2013.01); *G06V 10/40* (2022.01); *G06V 10/98* (2022.01); *G06T 2207/20081* (2013.01); *G06T 2207/20084* (2013.01); *G06T 2207/30148* (2013.01)

(58) Field of Classification Search
CPC ........ G06T 2207/30148; G06K 9/6267; G06V 10/40; G06V 10/98; G01N 21/9501
See application file for complete search history.

(56) References Cited

U.S. PATENT DOCUMENTS

| | | | |
|---|---|---|---|
| 2017/0067060 A1* | 3/2017 | DeFougerolles | A61P 31/20 |
| 2017/0177997 A1* | 6/2017 | Karlinsky | G06V 10/82 |
| 2017/0200265 A1* | 7/2017 | Bhaskar | G03F 1/86 |
| 2017/0357895 A1* | 12/2017 | Karlinsky | G06N 3/0454 |
| 2017/0364798 A1* | 12/2017 | Karlinsky | G06N 3/0454 |
| 2018/0330511 A1* | 11/2018 | Ha | G06V 10/7715 |
| 2019/0067060 A1* | 2/2019 | Plihal | G06T 7/0006 |

OTHER PUBLICATIONS

Lin, G., et al. "RefineNet: Multi-path refinement networks with identity mappings for high-resolution semantic segmentation. Nov. 25, 2016." arXiv preprint arXiv:1611.06612.

Lin, Guosheng, et al. "Refinenet: Multi-path refinement networks for high-resolution semantic segmentation." Proceedings of the IEEE conference on computer vision and pattern recognition. 2017, 10 pgs.

Huang, Gao, et al. "Densely connected convolutional networks." Proceedings of the IEEE conference on computer vision and pattern recognition. 2017, 9 pgs.

De Cheng, et al. "Person re-identification by multi-channel parts-based cnn with improved triplet loss function." Proceedings of the IEEE conference on computer vision and pattern recognition. 2016, 10 pgs.

Taigman, Yaniv, et al. "Deepface: Closing the gap to human-level performance in face verification." Proceedings of the IEEE conference on computer vision and pattern recognition. 2014, 8 pgs.

Kooi, Thijs, et al. "Large scale deep learning for computer aided detection of mammographic lesions." Medical image analysis 35 (2017): 303-312.

"Inception Module" https://www.youtube.com/watch?v=VxhSouuSZDY (Jun. 6, 2016), 1 pg.

Koch, Gregory, Richard Zemel, and Ruslan Salakhutdinov. "Siamese neural networks for one-shot image Yecognition." ICML deep learning workshop. Vol. 2. 2015, 30 pgs.

Kawahara, Jeremy, "(deep convolutional) generative adversarial nets—slides" accessed at http://kawahara.ca/Jeep-convolutional-generative-adversarial-nets-slides/ (Oct. 2, 2016), 4 pgs.

Goodfellow, Ian J., et al. "Generative adversarial networks." arXiv preprint arXiv:1406.2661 (2014)m 9 pgs.

Radford, A., Metz, L., & Chintala, S. (2015). Unsupervised representation learning with deep convolutional generative adversarial networks. arXiv preprint arXiv:1511.06434, 16 pgs.

Salimans, Tim, et al. "Improved techniques for training gans." arXiv preprint arXiv: 1606.03498 (2016), 10 pgs.

LeCun, Yann, "What are some recent and potentially upcoming breakthroughs in deep learning?" accessed at https://quorasessionwithyannlecun.quora.com/What-are-some-recent-and-potentially-upcoming-breakthroughs-in-deep-earning (Jul. 29, 2016), 2 pgs.

"Image Completion with Deep Learning in TensorFlow" accessed at http://bamos.github.io/2016/08/09/deep-completion/ (Aug. 9, 2016), 8 pgs.

Yeh, Raymond, et al. "Semantic image inpainting with perceptual and contextual losses." arXiv preprint arXiv: 1607.07539 2.3 (2016), 10 pgs.

Karpathy, Andrej, "Lessons learned from manually classifying CIFAR-10" accessed at http://karpathy.github.io/2011/04/27/manually-classifying-cifar10/ (Apr. 27, 2011), 3 pgs.

Taigman, Yaniv, Adam Polyak, and Lior Wolf. "Unsupervised cross-domain image generation." arXiv preprint arXiv: 1611.02200 (2016), 14 pgs.

Che, Zhengping, et al. "Recurrent neural networks for multivariate time series with missing values." Scientific reports 8.1 (2018): 1-12.

Hinton, Geoffrey, et al. "Unsupervised discovery of nonlinear structure using contrastive backpropagation." Cognitive science 30.4 (2006): 725-731.

Gatys, Leon A., Alexander S. Ecker, and Matthias Bethge. "A neural algorithm of artistic style." arXiv preprint arXiv:1508.06576 (2015), 16 pgs.

* cited by examiner

METHOD OF DEEP LEARNING-BASED EXAMINATION OF A SEMICONDUCTOR SPECIMEN AND SYSTEM THEREOF

RELATED CASES

This application is a continuation application of International Application No. PCT/IL2019/050155, filed Feb. 7, 2019, which claims priority to U.S. Provisional Application No. 62/627,692, filed Feb. 7, 2018, both of which are herein incorporated by reference.

TECHNICAL FIELD

The presently disclosed subject matter relates, in general, to the field of examination of a specimen, and more specifically, to methods and systems for automating of a specimen's examination.

BACKGROUND

Current demands for high density and performance, associated with ultra large scale integration of fabricated devices, require submicron features, increased transistor and circuit speeds, and improved reliability. Such demands require formation of device features with high precision and uniformity, which, in turn, necessitate careful monitoring of the fabrication process, including automated examination of the devices while they are still in the form of semiconductor wafers. It is noted that the fabrication process can include pre-manufacture, manufacture and/or post-manufacture operations.

The term "specimen" used in this specification should be expansively construed to cover any kind of wafer, masks, and other structures, combinations and/or parts thereof used for manufacturing semiconductor integrated circuits, magnetic heads, flat panel displays, and other semiconductor-fabricated articles.

The term "examination" used in this specification should be expansively construed to cover any kind of metrology-related operations as well as operations related to detection and/or classification of defects in a specimen during its fabrication. Examination is carried out by using non-destructive examination tools during or after manufacture of the specimen to be examined. By way of non-limiting example, the examination process can include runtime scanning (in a single or in multiple scans), sampling, reviewing, measuring, classifying and/or other operations provided with regard to the specimen or parts thereof using the same or different examination tools. Likewise, at least a part of examination can be carried out prior to manufacture of the specimen to be examined and can include, for example, generating an examination recipe(s), training respective classifiers or other machine learning-related tools and/or other setup operations. It is noted that, unless specifically stated otherwise, the term "examination" or its derivatives used in this specification, is not limited with respect to resolution or to the size of an inspection area. A variety of non-destructive examination tools includes, by way of non-limiting example, scanning electron microscopes, atomic force microscopes, optical inspection tools, etc.

By way of non-limiting example, run-time examination can employ a two phase procedure, e.g. inspection of a specimen followed by review of sampled locations of potential defects. During the first phase, the surface of a specimen is inspected at high-speed and relatively low-resolution. In the first phase, a defect map is produced to show locations on the specimen suspected of having high probability of a defect. During the second phase, at least some of such suspected locations are more thoroughly analyzed with relatively high resolution. In some cases both phases can be implemented by the same inspection tool, and, in some other cases, these two phases are implemented by different inspection tools.

Examination processes are used at various steps during semiconductor fabrication to detect and classify defects on specimens. Effectiveness of examination can be increased by automatization of at least part of the process(es) as, for example, by using Automatic Defect Classification (ADC), Automatic Defect Review (ADR), etc.

GENERAL DESCRIPTION

In accordance with certain aspects of the presently disclosed subject matter, there is provided a method of examination a semiconductor specimen, the method comprising: upon obtaining by a computer a Deep Neural Network (DNN) trained for a given examination-related application within a semiconductor fabrication process, using the trained DNN to process a fabrication process (FP) sample, wherein the FP sample comprises one or more first FP images received from one or more first modalities and one or more second FP images received from one or more second modalities different from the first modalities, and wherein the trained DNN processes the one or more first FP images separately from the one or more second FP images; and processing by the trained DNN at least the results of the separate processing of the one or more first FP images and of the one or more second FP images to obtain, by the computer, examination-related data specific for the given application and characterizing at least one of the processed FP images. By way of non-limiting example, the one or more first FP images can be low-resolution images and the one or more second FP images can be high-resolution images.

When the FP sample further comprises numeric data (e.g. metadata, hand-crafted attributes, etc.) associated with the FP images in the FP sample, the method can further comprise: processing, by the trained DNN, at least part of the numeric data separately from processing the one or more first FP images and from processing the one or more second FP images. The examination-related data specific for the given application can be obtained by processing, by the trained DNN, the results of the separate processing of the one or more first FP images and of the one or more second FP images together with the results of processing the at least part of numeric data. Alternatively, obtaining the examination-related data specific for the given application can comprise aggregating by the trained DNN the results of the separate processing of the one or more first FP images and of the one or more second FP images thus giving rise to aggregated image data; and further processing the aggregated image data together with the results of the separate processing the at least part of numeric data.

By way of non-limiting example, the examination-specific application can be: detecting defects in the semiconductor specimen; classifying defects in the semiconductor specimen; registration between at least two fabrication process (FP) images; segmenting at least one FP image which is selected from the group comprising a high-resolution image of the semiconductor specimen, a low-resolution image of the semiconductor specimen and a design data-based image of the semiconductor specimen; regression-based reconstructing FP image in correspondence with data obtained by different examination modality and regression-based reconstruction of image properties, etc.

By way of non-limiting example, the one or more first modalities can differ from the one or more second modalities by at least one of: examination tool, channel of the same examination tool, operational parameters of the same examination tool and/or channel, layers of the semiconductor specimen corresponding to respective FP images, nature of obtaining the FP images and deriving techniques applied to the captured images.

In accordance with other aspects of the presently disclosed subject matter, there is provided a system usable for examination of a semiconductor specimen in accordance with the method above.

In accordance with other aspects of the presently disclosed subject matter, there is provided a non-transitory computer readable medium comprising instructions that, when executed by a computer, cause the computer to perform the method above.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "representing", "comparing", "generating", "training", "segmenting", "registering" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, a FPEI system and respective parts thereof disclosed in the present application.

The terms "non-transitory memory" and "non-transitory storage medium" used herein should be expansively construed to cover any volatile or non-volatile computer memory suitable to the presently disclosed subject matter.

The term "defect" used in this specification should be expansively construed to cover any kind of abnormality or undesirable feature formed on or within a specimen.

The term "design data" used in the specification should be expansively construed to cover any data indicative of hierarchical physical design (layout) of a specimen. Design data can be provided by a respective designer and/or can be derived from the physical design (e.g. through complex simulation, simple geometric and Boolean operations, etc.). Design data can be provided in different formats as, by way of non-limiting examples, GDSII format, OASIS format, etc. Design data can be presented in vector format, grayscale intensity image format, or otherwise.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Figure 1:
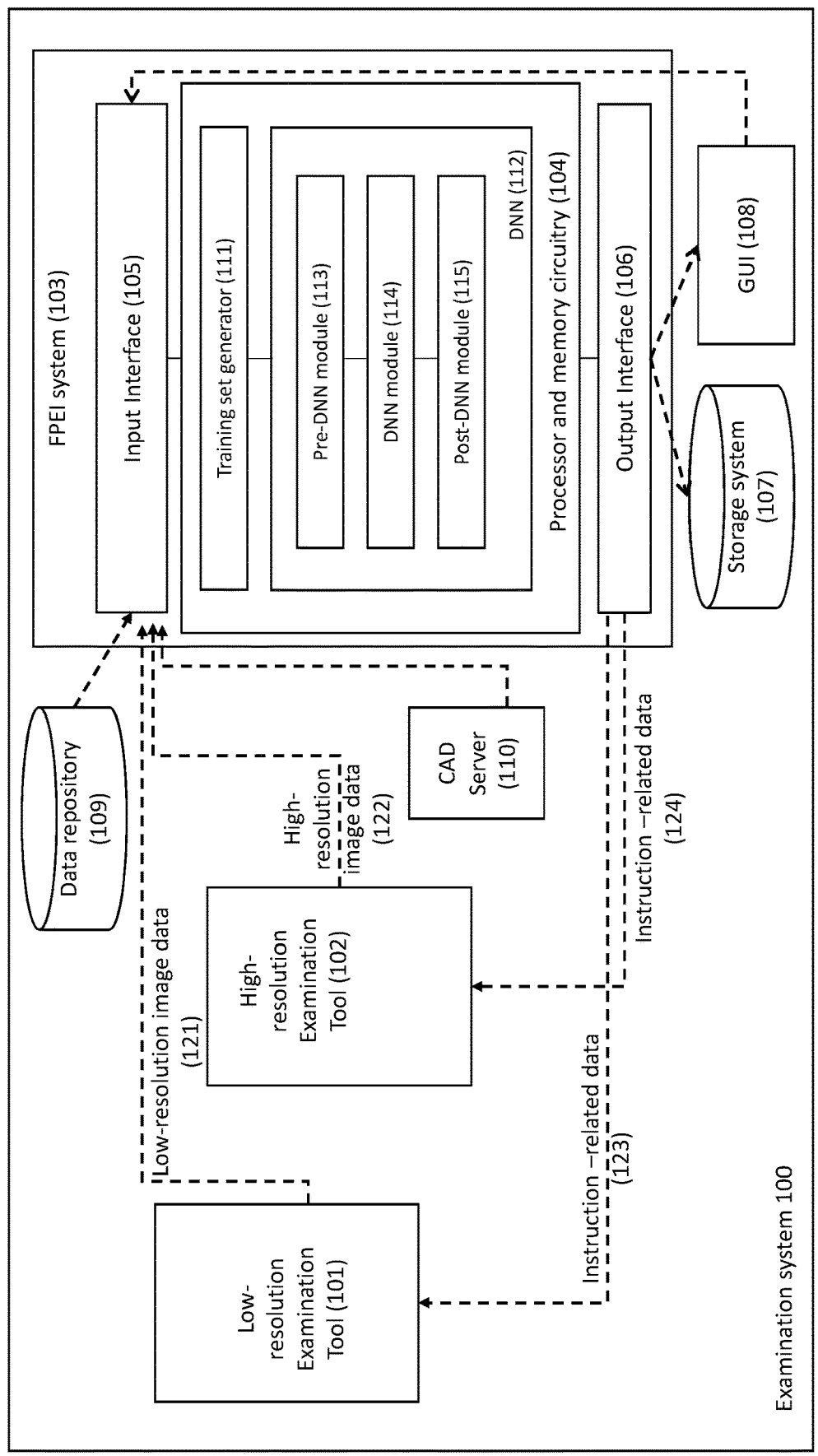
FIG. 1 illustrates a functional block diagram of an examination system in accordance with certain embodiments of the presently disclosed subject matter.

Bearing this in mind, attention is drawn to FIG. 1 illustrating a functional block diagram of an examination system in accordance with certain embodiments of the presently disclosed subject matter. The examination system 100 illustrated in FIG. 1 can be used for examination of a specimen (e.g. of a wafer and/or parts thereof) as part of the specimen fabrication process. The illustrated examination system 100 comprises computer-based system 103 capable of automatically determining metrology-related and/or defect-related information using images obtained during specimen fabrication. Such images are referred to hereinafter as fabrication process (FP) images. The system 103 is referred to hereinafter as an FPEI (Fabrication Process Examination Information) system. FPEI system 103 can be operatively connected to one or more low-resolution examination tools 101 and/or one or more high-resolution examination tools 102 and/or other examination tools. The examination tools are configured to capture FP images and/or to review the captured FP image(s) and/or to enable or provide measurements related to the captured image(s). The FPEI system can be further operatively connected to CAD server 110 and data repository 109.

FPEI system 103 comprises a processor and memory circuitry (PMC) 104 operatively connected to a hardware-based input interface 105 and to a hardware-based output interface 106. PMC 104 is configured to provide all processing necessary for operating FPEI system as further detailed with reference to FIGS. 2-5 and comprises a processor (not shown separately) and a memory (not shown separately). The processor of PMC 104 can be configured to execute several functional modules in accordance with computer-readable instructions implemented on a non-transitory computer-readable memory comprised in the PMC. Such functional modules are referred to hereinafter as comprised in the PMC. Functional modules comprised in PMC 104 include operatively connected training set generator 111 and Deep Neural Network (DNN) 112. DNN 112 comprises a DNN module 114 configured to enable data processing using deep neural network(s) for outputting application-related data based on the fabrication-process (FP) input data. Optionally, DNN 112 can comprise pre-DNN module 113 configured to provide preprocessing before forwarding input data to DNN module and/or post-DNN module 115 configured to provide post-processing data generated by DNN module. Operation of FPEI system 103, PMC 104 and the functional blocks therein will be further detailed with reference to FIGS. 2-5.

As will be further detailed with reference to FIGS. 2-5, FPEI system is configured to receive, via input interface 105, FP input data. FP input data can include data (and/or derivatives thereof and/or metadata associated therewith) produced by the examination tools and/or data produced and/or stored in one or more data repositories 109 and/or in CAD server 110 and/or another relevant data depository. It is noted that FP input data can include images (e.g. captured images, images derived from the captured images, simulated images, synthetic images, etc.) and associated numeric data (e.g. metadata, hand-crafted attributes, etc.). It is further noted that image data can include data related to a layer of interest and/or to one or more other layers of the specimen. Optionally, for training purposes, FP input data can include the entire available FAB data or part thereof selected in accordance with certain criteria.

FPEI system is further configured to process at least part of the received FP input data and send, via output interface 106, the results (or part thereof) to a storage system 107, to examination tool(s), to a computer-based graphical user interface (GUI) 108 for rendering the results and/or to external systems (e.g. Yield Management System (YMS) of a FAB). GUI 108 can be further configured to enable user-specified inputs related to operating FPEI system 103.

By way of non-limiting example, a specimen can be examined by one or more low-resolution examination machines 101 (e.g. an optical inspection system, low-resolution SEM, etc.). The resulting data (referred to hereinafter as low-resolution image data 121) informative of low-resolution images of the specimen can be transmitted—directly or via one or more intermediate systems—to FPEI system 103. Alternatively or additionally, the specimen can be examined by a high-resolution machine 102 (e.g. a subset of potential defect locations selected for review can be reviewed by a scanning electron microscope (SEM) or Atomic Force Microscopy (AFM)). The resulting data (referred to hereinafter as high-resolution image data 122) informative of high-resolution images of the specimen can be transmitted—directly or via one or more intermediate systems—to FPEI system 103.

It is noted that images of a desired location on a specimen can be captured at different resolutions. By way of non-limited example, so-called "defect images" of the desired location are usable to distinguish between a defect and a false alarm, while so-called "class images" of the desired location are obtained with higher resolution and usable for defect classification. In some embodiments, images of the same location (with the same or different resolutions) can comprise several images registered therebetween (e.g. images captured from the given location and one or more reference images corresponding to the given location).

Upon processing the FP input data (e.g. low-resolution image data and/or high-resolution image data, optionally together with other data as, for example, design data, synthetic data, etc.) FPEI system can send the results (e.g. instruction-related data 123 and/or 124) to any of the examination tool(s), store the results (e.g. defect attributes, defect classification, etc.) in storage system 107, render the results via GUI 108 and/or send them to an external system (e.g. to YMS).

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and/or hardware.

Without limiting the scope of the disclosure in any way, it should also be noted that the examination tools can be implemented as inspection machines of various types, such as optical imaging machines, electron beam inspection machines and so on. In some cases the same examination tool can provide low-resolution image data and high-resolution image data. In some cases at least one examination tool can have metrology capabilities.

As will be further detailed with reference to FIGS. 2-5, DNN module 114 can comprise a plurality of DNN subnetworks each comprising a plurality of layers organized in accordance with the respective DNN architecture. Optionally, at least one of DNN subnetworks can have an architecture different from the others. By way of non-limiting example, the layers in a subnetwork can be organized in accordance with Convolutional Neural Network (CNN) architecture, Recurrent Neural Network architecture, Recursive Neural Networks architecture, or otherwise. Optionally, at least part of the DNN subnetworks can have one or more common layers (e.g. final fuse layer, output full-connected layers, etc.).

Each layer of DNN module 114 can include multiple basic computational elements (CE) typically referred to in the art as dimensions, neurons, or nodes. Computational elements of a given layer can be connected with CEs of a preceding layer and/or a subsequent layer. Each connection between CE of a preceding layer and CE of a subsequent layer is associated with a weighting value. A given CE can receive inputs from CEs of a previous layer via the respective connections, each given connection being associated with a weighting value which can be applied to the input of the given connection. The weighting values can determine the relative strength of the connections and thus the relative influence of the respective inputs on the output of the given CE. The given CE can be configured to compute an activation value (e.g. the weighted sum of the inputs) and further derive an output by applying an activation function to the computed activation. The activation function can be, for example, an identity function, a deterministic function (e.g., linear, sigmoid, threshold, or the like), a stochastic function, or other suitable function. The output from the given CE can be transmitted to CEs of a subsequent layer via the respective connections. Likewise, as above, each connection at the output of a CE can be associated with a weighting value which can be applied to the output of the CE prior to being received as an input of a CE of a subsequent layer. Further to the weighting values, there can be threshold values (including limiting functions) associated with the connections and CEs.

The weighting and/or threshold values of a deep neural network can be initially selected prior to training, and can be further iteratively adjusted or modified during training to achieve an optimal set of weighting and/or threshold values in the trained DNN module. After each iteration, a difference can be determined between the actual output produced by DNN module and the target output associated with the respective training set of data. The difference can be referred to as an error value. Training can be determined to be complete when a cost function indicative of the error value is less than a predetermined value or when a limited change in performance between iterations is achieved. Optionally, at least part of DNN subnetworks can be trained separately prior to training the entire DNN.

A set of DNN input data used to adjust the weights/thresholds of the deep neural network is referred to hereinafter as a training set.

Inputs to DNN 112 can be pre-processed by pre-DNN module 113 prior to inputting to DNN module 114, and/or outputs of DNN module 114 can be post-processed by post-DNN module 115 before outputting from DNN 112. In such cases training of DNN 112 further includes determining parameters of the pre-DNN module and/or the post-DNN module. The DNN module can be trained so as to minimize cost function of the entire DNN, while parameters of the pre-DNN module and/or post-DNN module can be pre-defined and, optionally, can be adjusted during the training. A set of training-based parameters can further include parameters related to pre-DNN and post-DNN processing.

It is noted that the teachings of the presently disclosed subject matter are not bound by the number and/or architecture of DNN subnetworks.

It is noted that the examination system illustrated in FIG. 1 can be implemented in a distributed computing environment, in which the aforementioned functional modules shown in FIG. 1 can be distributed over several local and/or remote devices, and can be linked through a communication network. It is further noted that in other embodiments at least part of examination tools 101 and/or 102, data repositories 109, storage system 107 and/or GUI 108 can be external to the examination system 100 and operate in data communication with FPEI system 103 via input interface 105 and output interface 106. FPEI system 103 can be implemented as stand-alone computer(s) to be used in conjunction with the examination tools. Alternatively, the respective functions of the FPEI system can, at least partly, be integrated with one or more examination tools.

Figure 2:
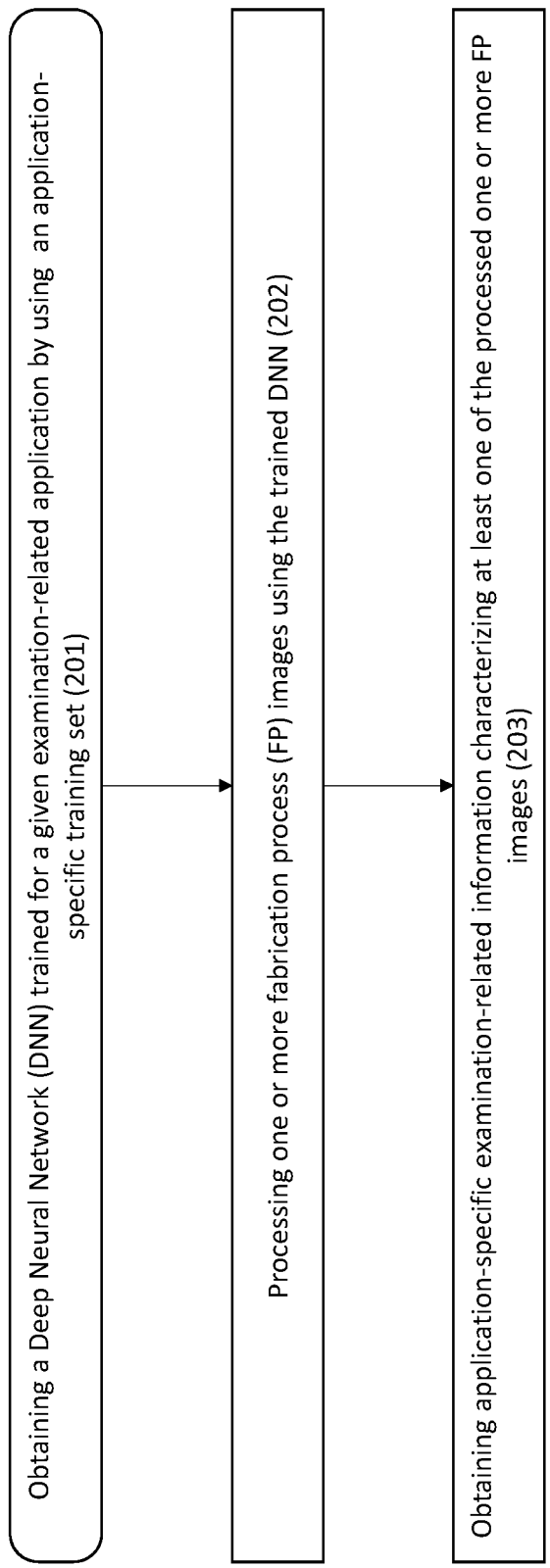
FIG. 2 illustrates a generalized flow-chart of using a deep neural network (DNN) automatically determining examination-related data based on fabrication process (FP) images in accordance with certain embodiments of the presently disclosed subject matter.

Referring to FIG. 2, there is illustrated a generalized flow-chart of using the DNN 112 for automatically determining examination-related data based on fabrication process (FP) images. As has been presented in US Patent Application No. 2017/0177997 assigned to the Assignee of the present application and incorporated herewith by reference in its entirety, the process includes a setup step comprising training the Deep Neural Network (DNN) 112, wherein DNN is trained for a given examination-related application and is characterized by an application-specific set of training-based parameters. By way of non-limiting example, an examination-related application can be one of the following:

defect classification using attributes generated by DNN (defining classes can include modifying and/or updating preexisting class definitions and/or identifying new classes);
segmentation of the fabrication process image including partitioning of FP image into segments (e.g. material types, edges, pixel labeling,
regions of interest, etc.);
defect detection (e.g. identifying one or more candidate defects (if they exist) using FP image and marking thereof, determining truth value for candidate defects, obtaining shape information for the defects, etc.).
registration between two or more images including obtaining the geometrical warping parameters between the images (can be global or local, simple as shift or more complex transformations);
cross-modality regression (e.g. reconstructing an image from one or more images from a different examination modality as, for example, SEM or optical image from CAD, height map from SEM images, high resolution image from low resolution images);
regression-based reconstruction of image properties (e.g. contact hole depths, etc.); and
combination(s) of the above.

DNN trained for a given application is obtained (201) during the setup step. During the runtime, the PMC of FPEI system uses the obtained trained DNN 112 to process (202) a FP sample comprising FP images. Thereby PMC obtains (203) application-specific examination-related data characterizing at least one of the images in the processed FP sample. When processing one or more FP images, PMC can also use predefined parameters and/or parameters received from other sources in addition to the training-based parameters characterizing DNN 112 upon training.

FP images in the FP sample can arrive from different examination modalities (e.g. from different examination tools, from different channels of the same examination tool as, for example, bright field and dark field images, from the same examination tool using different operational parameters, or can be derived from design data, etc.)

For example, FP images can be selected from images of the specimen (e.g. wafer or parts thereof) captured during the manufacturing process, derivatives of the captured images obtained by various pre-processing stages (e.g. images of a part of a wafer or a photomask captured by SEM or an optical inspection system, SEM images roughly centered around the defect to be classified by ADC, SEM images of larger regions in which the defect is to be localized by ADR, registered images of different examination modalities corresponding to the same mask location, segmented images, height map images, etc.), computer-generated design data-based images, etc. It is noted that FP images can comprise the images of a layer of interest and/or registered images of one or more other layers of the specimen. FP images of different layers are referred to hereinafter also as images received from the different modalities.

By way of non-limiting example, application-specific examination-related data can represent a per-pixel map of values whose meaning depends on an application (e.g. binary map for defect detection; discrete map for nuisance family prediction indicating the family type or general class; discrete map for defect type classification; continuous values for cross modality or die-to model (D2M) regression, etc.). A per-pixel map can be further obtained together with a per-pixel probability map indicative of probability of values obtained for the pixels.

Alternatively or additionally, application-specific examination-related data can represent one or more values summarizing the entire image content (not per-pixel), such as, for example, defect attributes, defect bounding box candidates and associated defectiveness probabilities for automatic defect review application, defect class and class probability for automatic defect classification application, etc.

Alternatively or additionally, obtained application-specific defect-related data can be not directly related to defects, but be usable for defect analyses (e.g. boundaries between layers of the wafer obtained by segmentation of FP images that can be usable for defining defects' layers, defect environment data as, for example, characteristics of the background pattern, etc.). Alternatively or additionally, examination-related data can be usable for metrology purposes.

It is further noted that in embodiments of the presently disclosed subject matter, characteristics of the images comprised in training samples and/or FP samples, differ from the regular RGB images used in the general Deep Neural Networks known in the art. For example, electron based imaging results in greyscale images with various effects as non-uniform noise distribution, charging effects, large variability between sensors (different tools), and more. Further, the SEM image is usually composed from 5 different grey scale images, each image corresponding to a different perspective in which the image was taken (Top, Left, Right, Up, Down).

Figure 3:
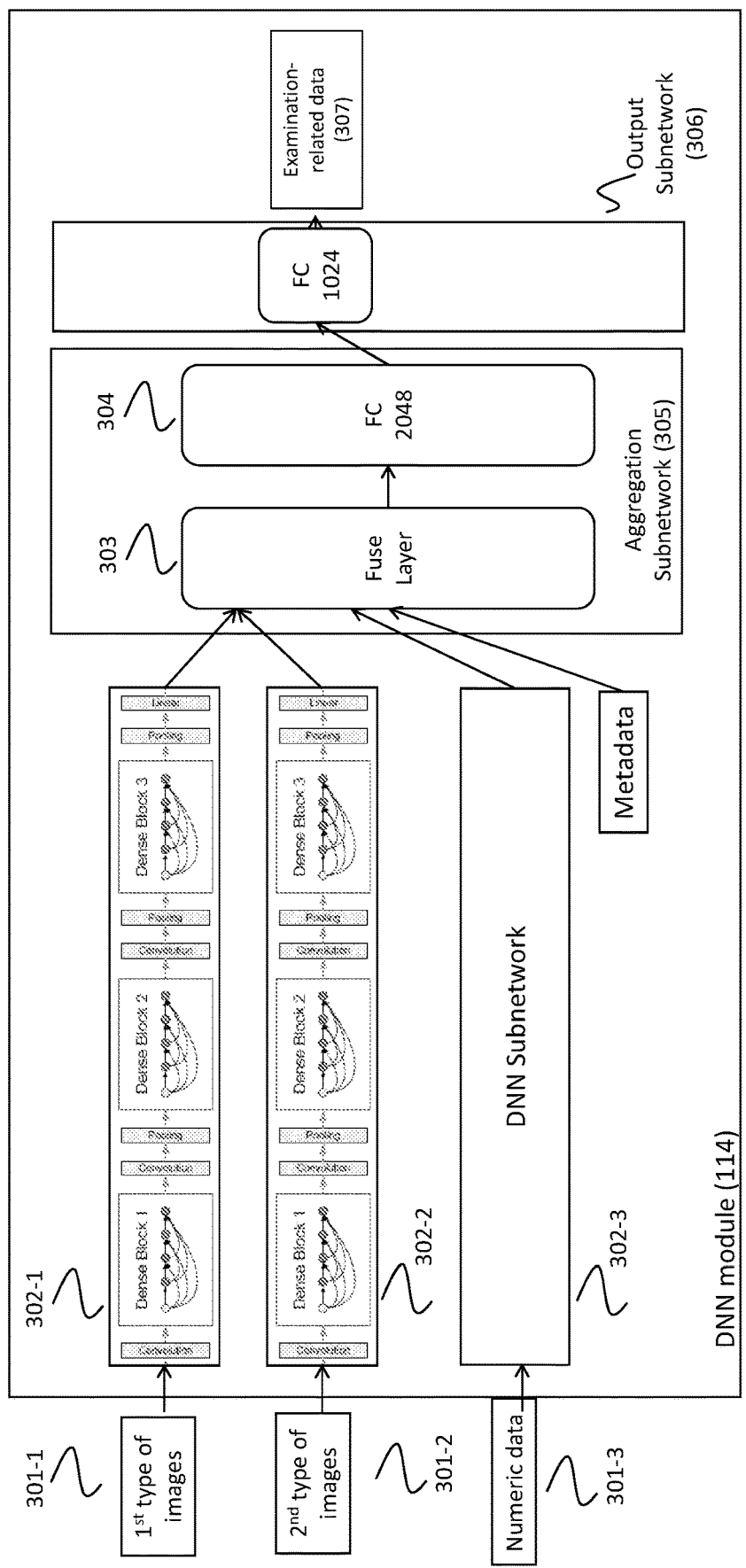
FIG. 3 illustrates a generalized functional diagram of DNN configured in accordance with certain embodiments of the presently disclosed subject matter.

Referring to FIG. 3, there is illustrated a generalized functional diagram of DNN 112 configured in accordance with certain embodiments of the presently disclosed subject matter.

As detailed above, DNN network can be trained and examination-related output data can be obtained using multiple data types of FP input data, such as, for example, images of different origin and resolution (e.g. Defect images, Class images, Reference images, CAD images, etc.), different types of numeric data, as, for example, different types of data derived from the images (e.g. height map, defect mask, grades, segmentations, etc.), different types of metadata (e.g. imaging conditions, pixel-size, etc.), different types of hand-crafted attributes (e.g. defect size, orientation, background segment, etc.), and alike. In accordance with certain embodiments of the presently disclosed subject matter, DNN 112 is configured to provide dedicated (i.e. separate) processing (during setup and during runtime) of different types of FP input data. Furthermore, as will be further detailed with reference to FIGS. 5a-5c, DNN 112 can be configured to combine the dedicated processing with further fusing input data of additional types, as well as with further fusing of results of a part.

DNN module 114 can comprise a plurality of input subnetworks (denoted 302-1-302-3), each given input subnetwork configured to process a certain type of FP input data (denoted 301-1-301-3) specified for the given subnetwork. The architecture of a given input subnetwork can correspond to respectively specified type(s) of input data or, alternatively, can be independent of the type of input data.

The input subnetworks can be connected to an aggregation subnetwork 305 that is further connected to an output subnetwork 306 configured to output application-specific examination-related data. Optionally, at least part of the input subnetworks can be directly connected to the aggregation subnetwork 305 or output subnetwork 306. Optionally, aggregation and output subnetworks can be organized in a single subnetwork.

The plurality of input subnetworks comprises one or more subnetworks (referred to hereinafter as "image subnetworks) configured to process FP images, wherein different image subnetworks are configured to process images received from different examination modalities. As illustrated, image subnetwork 302-1 processes $1^{st}$ type (301-1) of FP images (e.g. low-resolution images), and image subnetwork 302-2 separately processes $2^{nd}$ type (301-2) of FP images (e.g. high-resolution images).

By way of non-limiting example, the examination modalities can differ one from another by examination tools, different channels of the same examination tool, by operational parameters of the examination tools (e.g. by perspective and/or resolution provided by a certain examination tool/channel, etc.) and/or by a layer corresponding to the respective FP images. Alternatively of additionally, the examination modalities can differ one from another by a nature of obtaining the respective FP images—i.e. captured images, images derived thereof, pre-processed images (e.g. mean and/or diff images) and simulated images (including CAD-based images) are referred to hereinafter as images from examination modalities that differ by the nature of obtaining the respective images. Alternatively or additionally, the examination modalities can differ one from another by deriving techniques applied to the captured images (e.g. FP images derived by segmentation, defect contour extraction, height map calculation, etc.).

For purpose of illustration only, the following description is provided for image subnetworks with convolutional neural architecture (CNN). By way of non-limiting example, the architecture of image subnetworks can be provided in a manner disclosed in the article "Densely Connected Convolutional Networks" by Gao Huang et. al (https://arxiv.org/pdf/168.06993.pdf) incorporated herewith by reference in its entirety. Those skilled in the art will readily appreciate that the teachings of the presently disclosed subject matter are, likewise, applicable to other DNN architectures suitable for processing images.

The plurality of input subnetworks can further comprise at least one DNN subnetwork (denoted 302-3) configured to process numeric-type input data (e.g. metadata related to the FC images, general attributes related to one or more examination tools and/or one or more dyes, hand-crafted attributes, etc.). Alternatively or additionally, at least part of numeric-type input data can be directly fused into aggregation subnetwork 305 or output subnetwork 306.

Aggregation subnetwork 305 can comprise one or more fuse layers 303 connected to one or more fully-connected layers 304. Optionally, one or more fuse layers 303 can be organized in one or more fuse DNN subnetworks (parallel and/or sequential). Optionally, one or more fully-connected layers 304 can be organized in one or more fully-connected DNN subnetworks (parallel and/or sequential).

Optionally, output subnetwork 306 can comprise a custom layer configured to customize application-specific examination-related data (e.g. in accordance with FAB requirements).

For purpose of illustration only, the following description is provided for classification application. Those skilled in the art will readily appreciate that the teachings of the presently disclosed subject matter are, likewise, applicable to other applications related to examination of specimens. By way of non-limiting examples, the process detailed with reference to FIG. 3 can be, likewise, applicable to detecting defects in the specimen; registration between at least two fabrication process (FP) images; segmenting at least one FP image which is selected from the group comprising a high-resolution image of the specimen, a low-resolution image of the specimen and a design data-based image of the specimen; regression-based reconstructing FP image in correspondence with data obtained by different examination modality; metrology applications, regression-based reconstruction of image properties, etc.

Figure 4A:
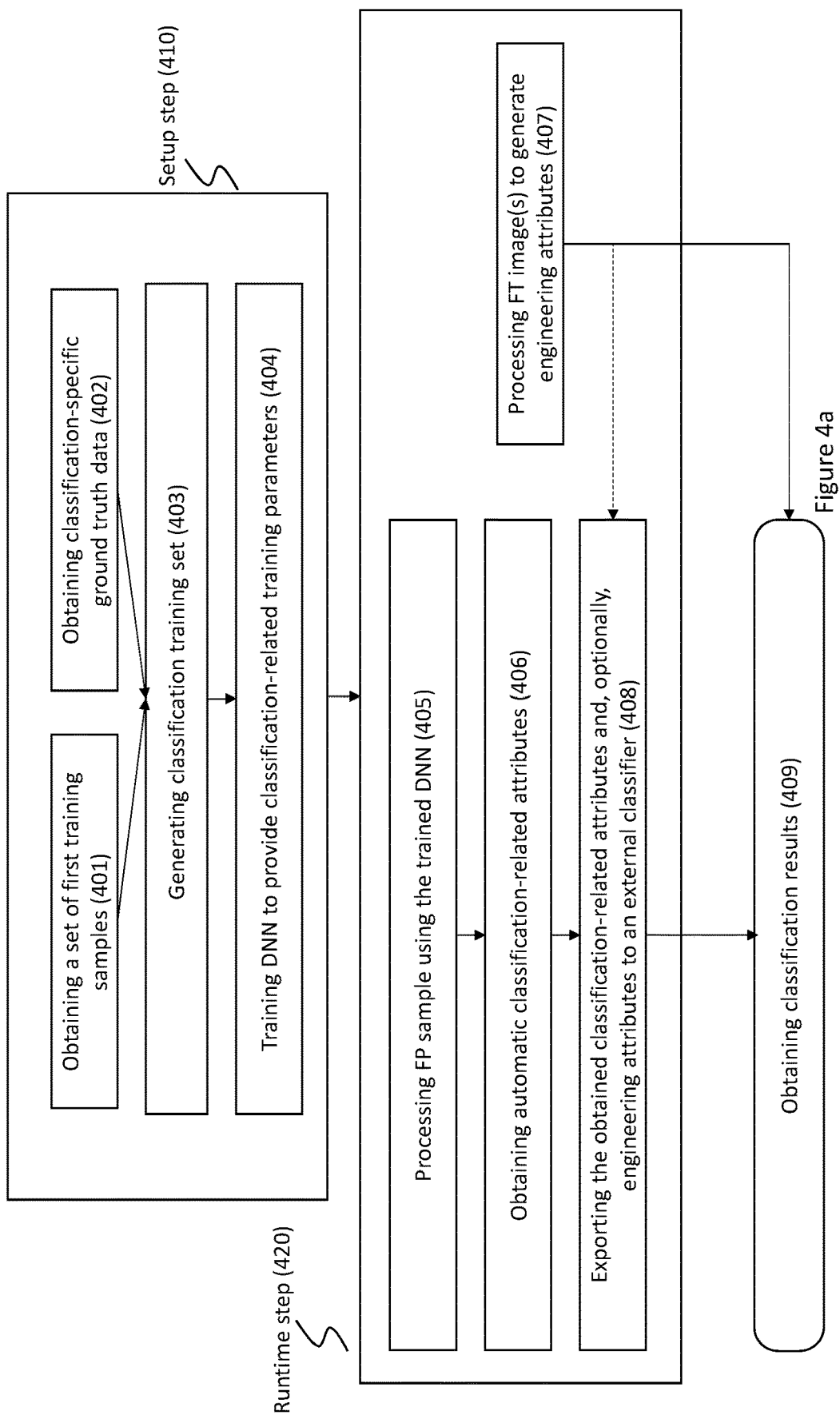
FIGS. 4a and 4b illustrate generalized flow-charts of classifying defects in accordance with certain embodiments of the presently disclosed subject matter.
Figure 4B:
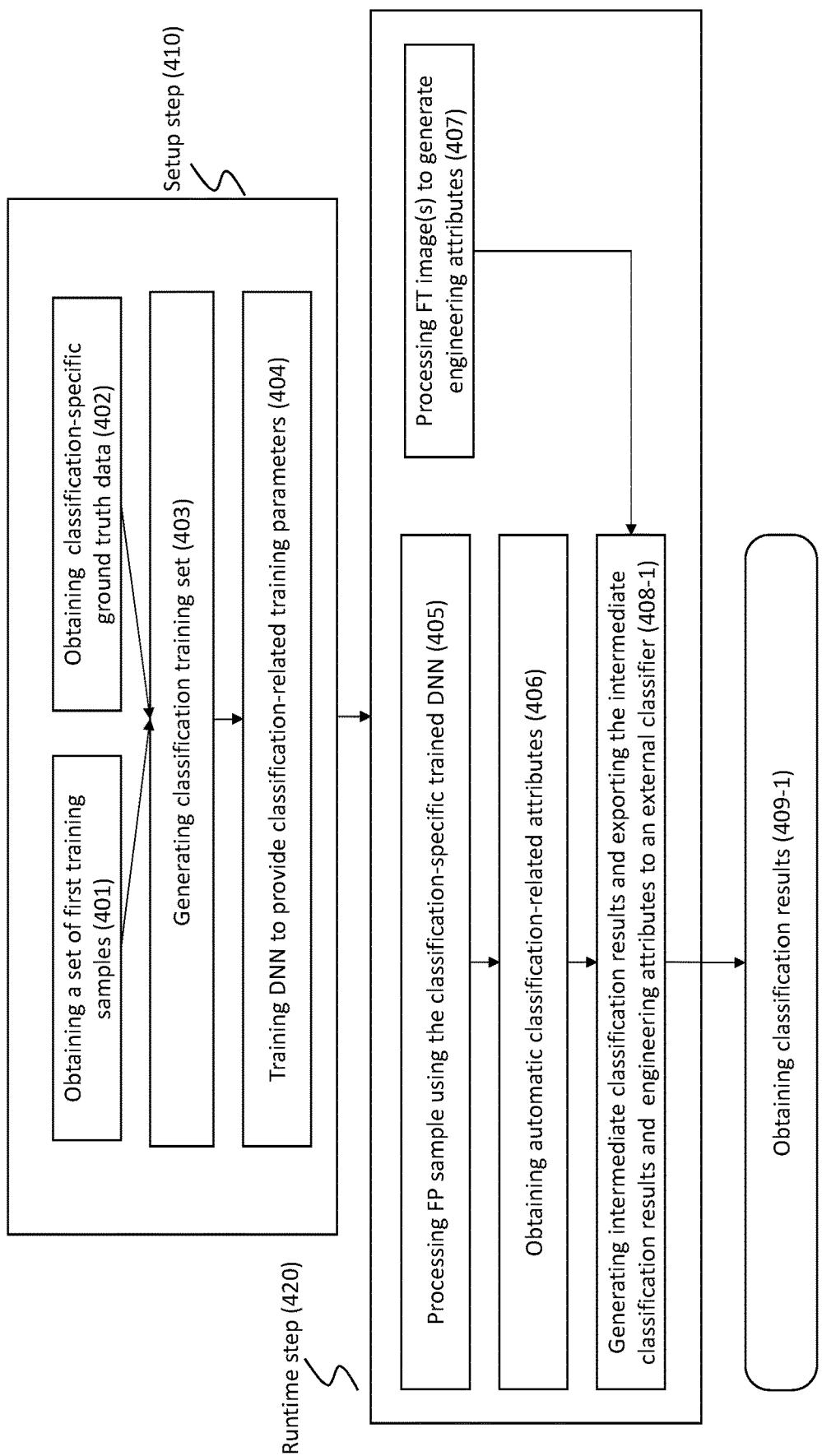

Referring to FIGS. 4a and 4b, there are illustrated non-limiting examples of obtaining examination-related data for classifying defects in a specimen.

The process comprises a setup step 410 of classification-specific training of DNN (e.g. to provide classification-related attributes enabling minimal defect classification error), and runtime step 420 of using the trained DNN for generating defect attributes and/or for defect classification.

During the setup 410 (common for FIGS. 4a and 4b), upon obtaining the set of first training samples comprising FP images and metadata thereof (401) and respective ground truth data (402), PMC 104 generates (403) a classification training set and uses the generated classification training set to obtain (404) the trained DNN characterized by classification-related training parameters. Generating (403) the classification training set can include augmenting the first training samples and the ground truth data and including the augmented training samples and augmented ground truth data into the training set. Alternatively or additionally, augmenting the first training set can include generating and including in the set synthetic training samples. Alternatively or additionally, generating (403) the classification training set can include generating derivatives of FP images (e.g. mean or diff images), hand-crafted attributes, etc.

It is noted that in accordance with certain embodiments of the presently disclosed subject matter, DNN can be trained based on the entire available FAB data (e.g. CAD data, high resolution images, low resolution images, metadata, general attributes, etc.) related to all types of layers/products from all manufacturing phases. Alternatively, training the DNN can be provided over a part of available FAB data selected in accordance with certain criteria (e.g. labeled/unlabeled/specific layer(s)/specific product(s)/specific class(s), etc.). DNN can be further constantly trained (e.g. responsive to new classes introduced in the FAB or on a routine automatic procedure) in order to maintain its relevance to the constantly changing FAB's data.

Optionally, DNN can be coarsely trained on a different data set, possibly irrelevant to the FAB, and further finely trained over at least part of available FAB data for specific examination-related application (e.g. with the help of transfer learning technique or other appropriate techniques).

It is further noted that due to the nature of the distribution of defects in the FAB, Parreto can be highly unbalanced and can be composed of 50-80% defects from a single class. FAB data can be further characterized by high misclassification rate and limited data availability. Techniques of augmentation and synthetic image generation enable tailoring FAB-data based training set to the requirements of the specific application. By way of non-limiting example, lack of FAB data related to a specific class of defects (e.g. a minority class) can be compensated by synthetic images presenting the respective defects. By way of a further non-limiting example, lack of appropriate FAB data related to a specific layer can be compensated by synthetic images related to this layer. By way of yet a further non-limiting example, synthetic images can be generated to recover missing information of a specific defect (e.g. high-resolution images).

Upon generating (403) the classification training set, PMC can train (404) the DNN to extract classification-related features and to provide defects' attributes (and/or defects' labels) enabling minimal classification error. The training process can include updating the training set. The training process yields the trained DNN with classification-related training parameters.

During runtime 420, PMC uses the classification-specific trained DNN to process (405) a FP sample and to obtain (406) defect attributes. By way of non-limiting example, a FP sample can comprise a group of images related to the defect to be classified and obtained by the same or by different examination modalities, reference die image, CAD-based image, data derived from the obtained images (e.g. height map, defect mask, grades, segmentations, etc.). An FP sample can further comprise metadata (e.g. imaging conditions, pixel-size, engineered attributes (e.g. defect size, orientation, background segment, etc.), etc.) related to the defect to be classified. By way of non-limiting example, metadata can be generated by the PMC in accordance with predefined instructions stored in the PMC and/or received from respective examination tools.

As will be further detailed with reference to FIGS. 5a-5c, in accordance with certain embodiments of the presently disclosed subject matter, data in the training samples and in the FC samples can be divided between respective input subnetworks. For example, the images from different examination modalities (or groups thereof) can constitute inputs to different image subnetworks.

By way of non-limiting example, low-resolution images from the FC sample (e.g. optical images and/or low-resolution SEM images and/or derivatives thereof) of a defect location obtained from different perspectives and/or under different illumination conditions, a respective reference image (e.g. die reference image, cell reference image, low-resolution CAD-based image related to the defect location, etc.) can constitute a "defect" level input to a first image subnetwork, while high resolution images from an FC sample (e.g. SEM images and/or derivatives thereof of the defect location obtained from different perspectives and/or under different illumination conditions, high-resolution CAD-based image related to the defect, etc.) can constitute a "class" level input to a second image subnetwork. Optionally, images of the same resolution can constitute inputs to more than one image subnetwork (e.g. captured images and images' derivatives can be fed to different input subnetworks).

Numeric data (e.g. metadata, hand-crafted attributes, etc.) comprised in the FC sample can constitute an input to a third input subnetwork or to the aggregation subnetwork or to the output subnetwork. Optionally, numeric data can constitute inputs for several input subnetworks, aggregation subnetwork or to output subnetwork depending on data type (e.g. metadata can be fed to the third input subnetwork while hand-made attributes can be fed to the aggregation subnetwork).

Optionally, training samples can correspond to FP samples. Each training sample can comprise at least the same number of images obtained by the same examination modalities and being in the same relationship as the images in a respective FP sample. Optionally, training samples can further comprise additional images obtained by additional examination modalities being, typically, unavailable during runtime. Distribution of data in the training sample over input subnetworks shall correspond to the respective distribution in FP samples. It is noted that in certain embodiments training samples can miss some images corresponding to the images in the FP sample. Such deficiencies can be compensated by different techniques, some of them known in the art. By way of non-limiting example, a missing image can be compensated by an image generated in accordance with mean values of corresponding images from other training samples.

In the process illustrated in FIG. 4a, the FPEI system exports (408) the defect attributes obtained by DNN and, optionally, the engineered attributes to an external classifier, and further exports the engineered attributes to an external classification system. Obtaining classification results (409) includes processing by an external classification system the results it receives from the external classifier (which can be, optionally, a part of the external classification system) together with engineered attributes.

In the process illustrated in FIG. 4b, FPEI system uses the classification-related attributes obtained by DNN and, optionally, the engineered attributes (optionally obtained 407 when processing FP image(s)) to generate (408-1) intermediate classification results. The FPEI system further exports (408-1) the intermediate classification results and the engineered attributes to an external classification system. The external classification system processes (409-1) the received data and yields the classified defect(s). Optionally, operation 408-1 can be omitted, and FPEI can use classification-related attributes obtained by DNN and the engineered attributes to yield the classified defects with no involvement of the external classification system. It is noted that engineered attributes can be a part of metadata input to DNN. Alternatively or additionally, engineered attributes and/or derivatives thereof can be a part of the defect representation.

Thus, as illustrated, the classification application can be implemented in different ways. By way of non-limiting example, the classification-specific trained DNN can classify a defect presented in an FP image based either on a combination of DNN classification-related attributes and engineered attributes it obtains, or based, merely, on the DNN obtained classification-related attributes. Alternatively, classification-specific trained DNN can enable classification of such defects by providing classification-related attributes (and, optionally, engineered attributes) to an external classification system.

Non-limiting examples of classification DNN networks are illustrated with reference to FIGS. 5a-5c. It is noted that, optionally, prior to feeding to input subnetwork, images can be pre-processed and resulted derivations (e.g. mean-externals, diff-externals, etc.) can be fed to the respective image subnetworks instead of, or in addition to, the images obtained by the examination tools.

Figure 5A:
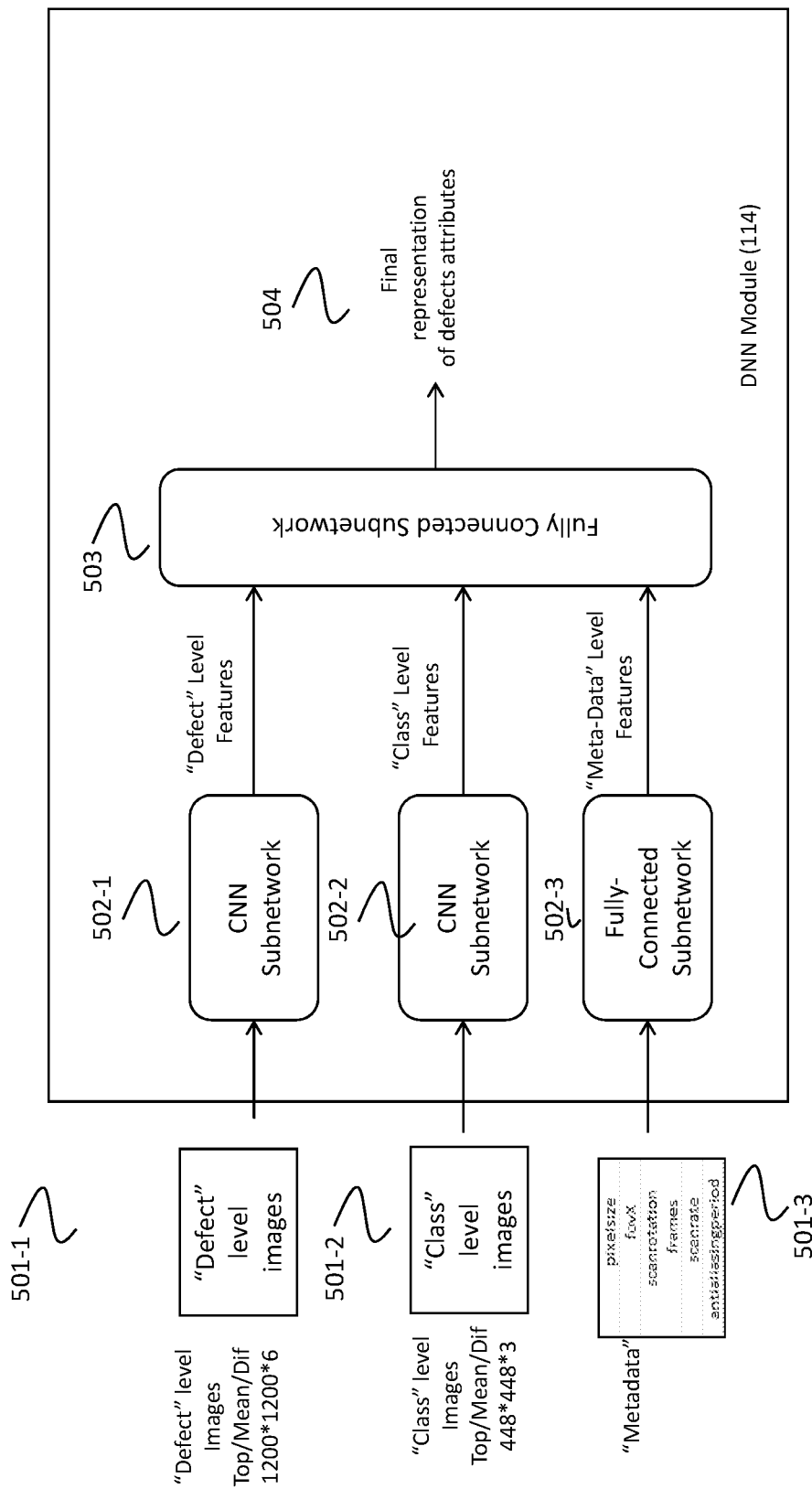
FIGS. 5a-5c illustrate non-limiting examples of architecture of classification DNN networks in accordance with certain embodiments of the presently disclosed subject matter.

As illustrated in FIG. 5a, data from the FP sample can be divided between three input subnetworks (denoted 502-1-502-3). CNN image subnetwork 502-1 processes "defect" level low-resolution images 501-1 to obtain "defect" level features, and CNN image subnetwork 502-2 processes "class" level high-resolution images 501-2 to obtain "class" level features. Metadata 501-3 (e.g. data informative of pixel size, FOV, scan rotation and scan rate, frames, etc.) are processed by fully-connected input subnetwork 502-3 to obtain "metadata" level features.

Optionally, the illustrated DNN can have one or more additional input subnetworks (e.g. ADR-based inputs, etc.).

The features individually generated by each of the input subnetworks are fused to fully connected subnetwork 503 which aggregates the received features and computes a final attributes representation.

In the illustrated in FIG. 5a example, data fusion from all different sources is provided as feature-based.

Figure 5B:
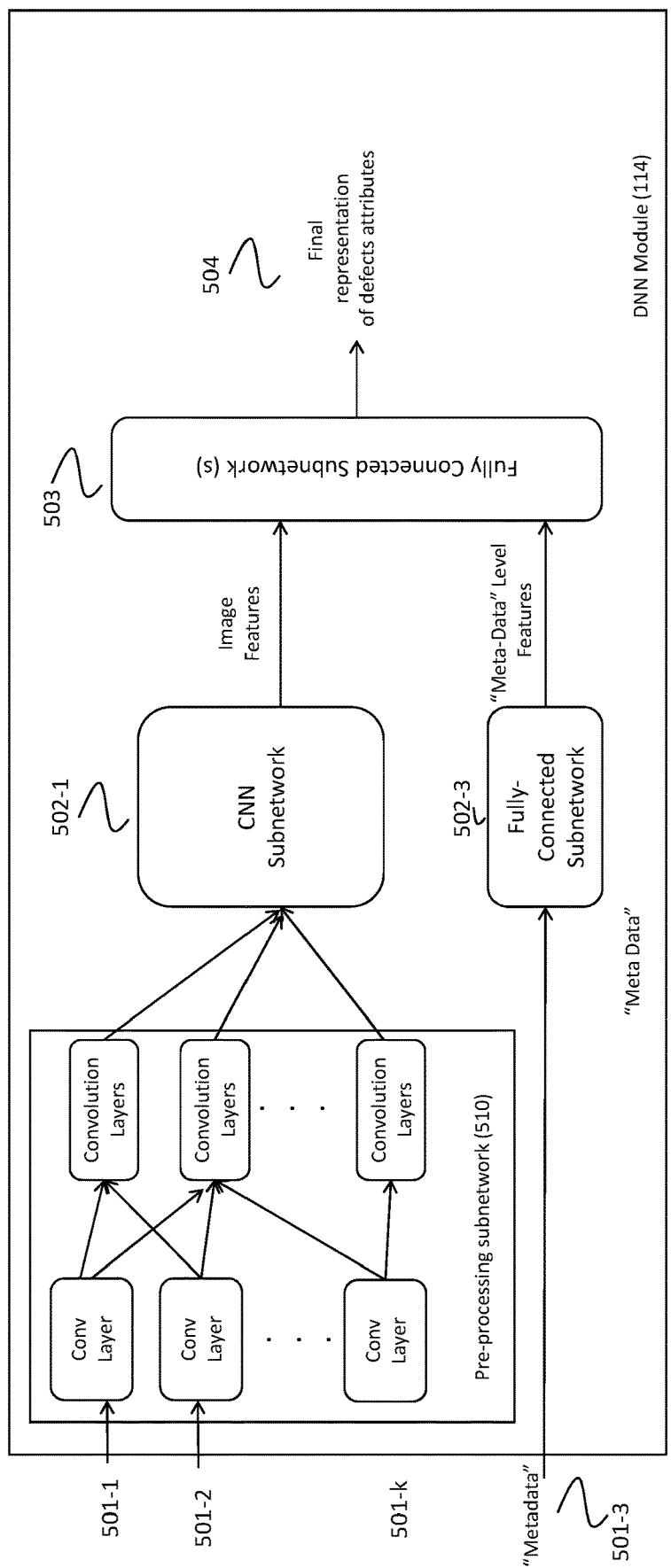

FIG. 5b illustrates an example of a data-based fusion followed by a feature-based fusion. Different image data 501-1-501-2k are pre-processed together by pre-processing subnetwork 510. Optionally, pre-processing subnetwork 510 can comprise a separate first convolution layer for each type of images (e.g. for each of the examination modalities or each group thereof). Optionally, all first convolution layers can be identical. Further, pre-processing subnetwork 510 can aggregate the images to obtain an aggregated image (e.g. obtained per pixel maximum). The resulted aggregated image is fed into input subnetwork 502-1 to extract aggregated image features. Further, numeric level features and aggregated image features are fed into output subnetwork 503 to obtain the final attributes representation.

Figure 5C:
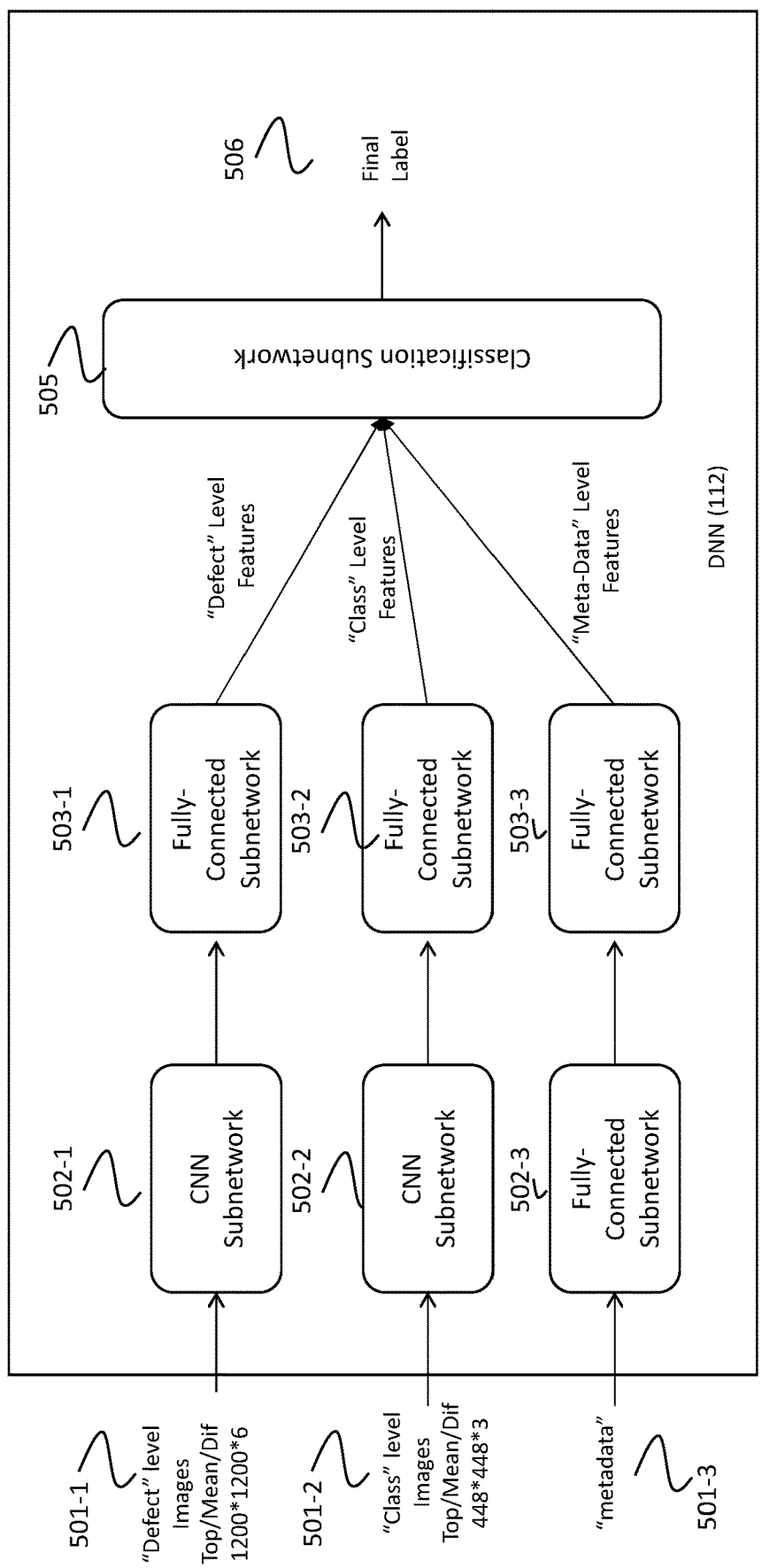

FIG. 5c illustrates an example of a decision-based fusion. Each input subnetwork 502-1-502-3 feds a respectively dedicated fully connected subnetwork (denoted 503-1-503-3). Thus, each input type is provided by a dedicated channel extracting the features of the respective level. Final defect-level features, final class-level features and final metadata features are fused to classification subnetwork 505 which aggregates the received features and computes classification labels for known classes.

It is noted that the final attributes representation (e.g. as illustrated in FIGS. 5a and 5b) enables further classification also to one or more previously unknown classes.

Thus, as illustrated above, the DNN is capable of generating defect representation using FP samples comprising a variety of data (e.g. source images obtained from different perspectives and with different resolution, image content (context\defect), derivatives from source images (height map, segmentation, etc.), numeric data (e.g. pixel size, handcrafted attributes), etc.), thereby providing accuracy of classification results.

Among further advantages of certain embodiments of the presently disclosed subject matter is enabling an FAB-based automatic procedure capable of creating new attributes for future introduced classes.

Among further advantages of certain embodiments of the presently disclosed subject matter is capability of generating a stable attributes space with no need for constant expert calibration.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of examination a semiconductor specimen, the method comprising:
    upon obtaining by a computer a Deep Neural Network (DNN) trained for a given examination-related application within a semiconductor fabrication process, using the trained DNN to runtime process a fabrication process (FP) sample to be examined, wherein the FP sample comprises one or more first FP images received from one or more first examination modalities and one or more second FP images received from one or more second examination modalities different from the first examination modalities, and wherein the trained DNN processes the one or more first FP images separately from and in parallel to processing the one or more second FP images; and using the trained DNN to runtime process together, at least the results of the runtime processing of the one or more first FP images and of the one or more second FP images to obtain, by the computer, examination-related data specific for the given application and characterizing at least one of the processed FP images in the FP sample.

2. The method of claim 1, wherein the FP sample further comprises numeric data associated with the FP images in the FP sample, the method further comprising:

processing, by the trained DNN, at least part of the numeric data separately from processing the one or more first FP images and from processing the one or more second FP images; and obtaining the examination-related data specific for the given application by processing, by the trained DNN, the results of the separate processing of the one or more first FP images and of the one or more second FP images together with the results of processing the at least part of numeric data.

3. The method of claim 1, wherein the FP sample further comprises numeric data associated with the FP images in the FP sample, the method further comprising:

processing, by the trained DNN, at least part of the numeric data separately from processing the one or more first FP images and from processing the one or more second FP images; and aggregating by the trained DNN the results of the separate processing of the one or more first FP images and of the one or more second FP images thus giving rise to aggregated image data; and obtaining the examination-related data specific for the given application by processing, by the trained DNN, the aggregated image data together with the results of the separate processing the at least part of numeric data.

4. The method of claim 1, wherein the examination-specific application is selected from a group comprising: detecting defects in the semiconductor specimen; classifying defects in the semiconductor specimen; registration between at least two fabrication process (FP) images; segmenting at least one FP image which is selected from the group comprising a high-resolution image of the semiconductor specimen, a low-resolution image of the semiconductor specimen and a design data-based image of the semiconductor specimen; regression-based reconstructing FP image in correspondence with data obtained by different examination modality and regression-based reconstruction of image properties.

5. The method of claim 1, wherein the one or more first examination modalities differ from the one or more second examination modalities by at least one of: examination tool, channel of the same examination tool, operational parameters of the same examination tool and/or channel, layers of the semiconductor specimen corresponding to respective FP images, nature of obtaining the FP images and deriving techniques applied to captured images.

6. The method of claim 1, wherein the one or more first FP images are low-resolution images and the one or more second FP images are high-resolution images.

7. The method of claim 2, wherein the numeric data comprise metadata and/or hand-crafted attributes.

8. The method of claim 1, wherein the DNN is trained using FAB data collected for all types of layers and products from all manufacturing phases.

9. The method of claim 1, wherein the DNN is coarsely trained on a data set different from the FAB data, and further finely trained for specific examination-related application on at least a part of the FAB data.

10. The method of claim 1, wherein the examination-specific application is classifying defects in the semiconductor specimen, and wherein the examination-related data specific for the given application are classification-related attributes and/or classification labels characterizing at least one defect to be classified.

11. A system usable for examination of a semiconductor specimen, the system comprising a processing and memory block (PMB) operatively connected to an input interface and an output interface, wherein:

the input interface is configured to receive one or more fabrication process (FP) images; the PMB is configured to:

obtain a Deep Neural Network (DNN) trained for a given examination-related application within a semiconductor fabrication process;

use the trained DNN to runtime process a fabrication process (FP) sample to be examined, wherein the FP sample comprises one or more first FP images received from one or more first examination modalities and one or more second FP images received from one or more second examination modalities which differ from the first examination modalities, and wherein the trained DNN processes the one or more first FP images separately from and in parallel to processing of the one or more second FP images; and use the trained DNN to runtime process together, at least the results of the runtime processing of the one or more first FP images and of the one or more second FP images to obtain, by the computer, examination-related data specific for the given application and characterizing at least one of the processed FP images in the FP sample.

12. The system of claim 11, wherein the FP sample further comprises numeric data associated with the FP images in the FP sample, and wherein the PMC is further configured to:

process, by the trained DNN, at least part of the numeric data separately from processing the one or more first FP images and from processing the one or more second FP images; and obtain the examination-related data specific for the given application by processing, by the trained DNN, the results of the separate processing of the one or more first FP images and of the one or more second FP images together with the at least part numeric data.

13. The system of claim 11, wherein the FP sample further comprises numeric data associated with the FP images in the FP sample, and wherein the PMC is further configured to:

process, by the trained DNN, at least part of the numeric data separately from processing the one or more first FP images and from processing the one or more second FP images; and aggregate by the trained DNN the results of the separate processing of the one or more first FP images and of the one or more second FP images thus giving rise to aggregated image data; and obtain the examination-related data specific for the given application by processing, by the trained DNN, the aggregated image data together with the results of the separate processing the at least part numeric data.

14. The system of claim 11, wherein the one or more first examination modalities differ from the one or more second examination modalities by at least one of: examination tool, channel of the same examination tool, operational parameters of the same examination tool and/or channel, layers of the semiconductor specimen corresponding to respective FP images, nature of obtaining the FP images and deriving techniques applied to captured images.

15. The system of claim 11, wherein the one or more first FP images are low-resolution images and the one or more second FP images are high-resolution images.

16. The system of claim 12, wherein the numeric data comprise metadata and/or hand-crafted attributes.

17. The system of claim 11, wherein the DNN is trained using FAB data collected for all types of layers and products from all manufacturing phases.

18. The system of claim 11, wherein the DNN is coarsely trained on a data set different from the FAB data, and further finely trained for specific examination-related application on at least a part of the FAB data.

19. The system of claim 11, wherein the examination-specific application is classifying defects in the semiconductor specimen, and wherein the examination-related data specific for the given application are classification-related attributes and/or classification labels characterizing at least one defect to be classified.

20. A non-transitory computer-readable medium comprising instructions that, when executed by a computer, cause the computer to perform a method of examining a semiconductor specimen, the method comprising:
upon obtaining by a computer a Deep Neural Network (DNN) trained for a given examination-related application within a semiconductor fabrication process, using the obtained trained DNN to runtime process a fabrication process (FP) sample to be examined, wherein the FP sample comprises one or more first FP images received from one or more first examination modalities and one or more second FP images received from one or more second examination modalities which differ from the first examination modalities, and wherein the trained DNN processes the one or more first FP images separately from and in parallel to processing of the one or more second FP images; and
using the trained DNN to runtime process together at least the results of the runtime processing of the one or more first FP images and of the one or more second FP images to obtain examination-related data specific for the given application and characterizing at least one of the processed one or more FP images in the FP sample.

* * * * *